(12) United States Patent
Starck

(10) Patent No.: US 7,978,965 B2
(45) Date of Patent: Jul. 12, 2011

(54) TANK HEATING SYSTEM

(76) Inventor: Roland Starck, Bellheim (DE)

( * ) Notice: Subject to any disclaimer, the term of this patent is extended or adjusted under 35 U.S.C. 154(b) by 812 days.

(21) Appl. No.: 11/922,618

(22) PCT Filed: Jun. 17, 2006

(86) PCT No.: PCT/EP2006/005820
§ 371 (c)(1),
(2), (4) Date: Dec. 20, 2007

(87) PCT Pub. No.: WO2007/006393
PCT Pub. Date: Jan. 18, 2007

(65) Prior Publication Data
US 2009/0028533 A1    Jan. 29, 2009

(30) Foreign Application Priority Data
Jul. 12, 2005    (DE) .......................... 10 2005 032 823

(51) Int. Cl.
*F24H 1/20* (2006.01)
(52) U.S. Cl. ...................................................... 392/451
(58) Field of Classification Search ........... 392/322–497
See application file for complete search history.

(56) References Cited

U.S. PATENT DOCUMENTS

| 4,343,988 | A |   | 8/1982  | Roller et al. |
| 5,884,475 | A |   | 3/1999  | Hoffmann et al. |
| 5,974,227 | A | * | 10/1999 | Schave .......................... 392/478 |
| 6,063,350 | A |   | 5/2000  | Tarabulski et al. |
| 7,017,336 | B2 |  | 3/2006  | Stiermann |
| 7,509,799 | B2 | * | 3/2009 | Amou et al. ..................... 60/286 |
| 2004/0217103 | A1 | | 11/2004 | Knetsch et al. |
| 2005/0013756 | A1 | * | 1/2005 | Amou et al. ............... 423/239.1 |
| 2006/0236679 | A1 |   | 10/2006 | Meyer et al. |

FOREIGN PATENT DOCUMENTS

| DE | 2521754    | A  | 11/1976 |
| DE | 4432577    | A1 | 3/1996  |
| DE | 10148880   | A1 | 8/2002  |
| DE | 20121115   | U1 | 5/2003  |
| DE | 10341996   | A1 | 3/2005  |
| EP | 1503055    | A1 | 7/2004  |
| EP | 1473447    | A1 | 11/2004 |

* cited by examiner

*Primary Examiner* — Daniel Robinson

(57) ABSTRACT

The invention relates to a tank heater, especially for a urea tank of an internal combustion engine, comprising a housing (2) in which at least one PTC element is arranged, an electrical connecting cable (3, 4) that is joined to the PTC element so as to conduct a heating current through the PTC element, and an intake pipe (5) for conveying liquid. At least one section of the electrical connecting cable (5) is embodied as a resistive heating element which is connected in a thermally conducting manner to the interior of the intake pipe (5).

18 Claims, 5 Drawing Sheets

TANK HEATING SYSTEM

The invention relates to a tank heating system, in particular for a urea tank of an internal combustion engine.

A waste gas cleaning catalyst requires urea as alkaline air provider. Thus, a urea tank is a standard feature of motor vehicles for the storing of urea solution for the waste gas cleaning catalyst. Since it is possible for the urea solution to freeze in the case of frost, a tank heating system is required in order to defrost the urea solution as rapidly as possible so that the required urea is available for the catalyst.

SUMMARY OF THE INVENTION

The object of the invention is to present a cost-effective manner in which a waste gas cleaning catalyst of an internal combustion engine can be rapidly brought into an operative condition in the case of temperatures below the freezing point.

This problem is solved by means of a tank heating system with the characteristics set forth in claim 1.

In the case of temperatures below freezing point, with a tank heating system according to the invention it is possible to pump considerably faster a liquid urea solution through the intake pipe to a waste gas cleaning catalyst. Namely, in the case of a customary tank heater, the frozen urea in the intake pipe is defrosted at a moment at which a considerable portion of the urea solution in the urea tank has already been thawed out, so that only relatively late the urea solution can be pumped to the waste gas cleaning catalyst. In the case of a tank heating system according to the invention, the intake pipe is also heated so that the therein contained urea solution defrosts early on and, accordingly, it is possible to rapidly pump urea solution to the waste gas cleaning catalyst. In the case of a tank heating system according to the invention, this advantage is obtained in an extraordinarily cost-effective manner because at least one section of the required electrical connection line is configured as a resistance heating element for the defrosting of the frozen urea in the intake pipe.

By way of example, the intake pipe can be arranged next to the housing and the connection line can be lead along the housing or the intake pipe, or it can be wound around it. Another possibility is to configure the intake pipe as a channel in the housing of the tank heating system. In particular, the section of the connection line configured as a resistance heating element can be formed by the intake pipe itself, insofar as the latter is made out of a metal with a sufficiently high resistance, in particular high-grade steel such as, e.g., V4A steel.

Insofar as for the connection line is used a material that with respect to the urea solution is insufficiently corrosion resistant, it can be protected by an appropriate protective layer out of a corrosion-resistant synthetic material.

In the case of the mentioned connection line it deals with the connection line of the PTC (Positive Temperature Coefficient) element provided according to the invention. By using the connection line of the PTC element for the heating of the intake pipe, the controlling property of the PTC element is advantageously used for the regulating of the heat for the intake pipe.

The PTC element of a tank heating system according to the invention is preferably a PTC heating element. In principle, however, it is also possible to configure the PTC element as a control element and to connect it in series with an appropriate heating element. It is advantageous if ahead of or behind the heating elements of the tank heating system a heating output is emitted that amounts to at least double of the calorific output emitted by the connector lines. In particular, a calorific output of the PTC heating element(s) of at least 50 W is particularly favorable for the heating of an internal combustion engine's urea tank.

Further details and advantages of the invention are explained by way of an embodiment with reference to the hereto attached illustrations. The therein described characteristics can be used either individually or combined in order to create preferred embodiments of the invention.

DETAILED DESCRIPTION

Figure 1:
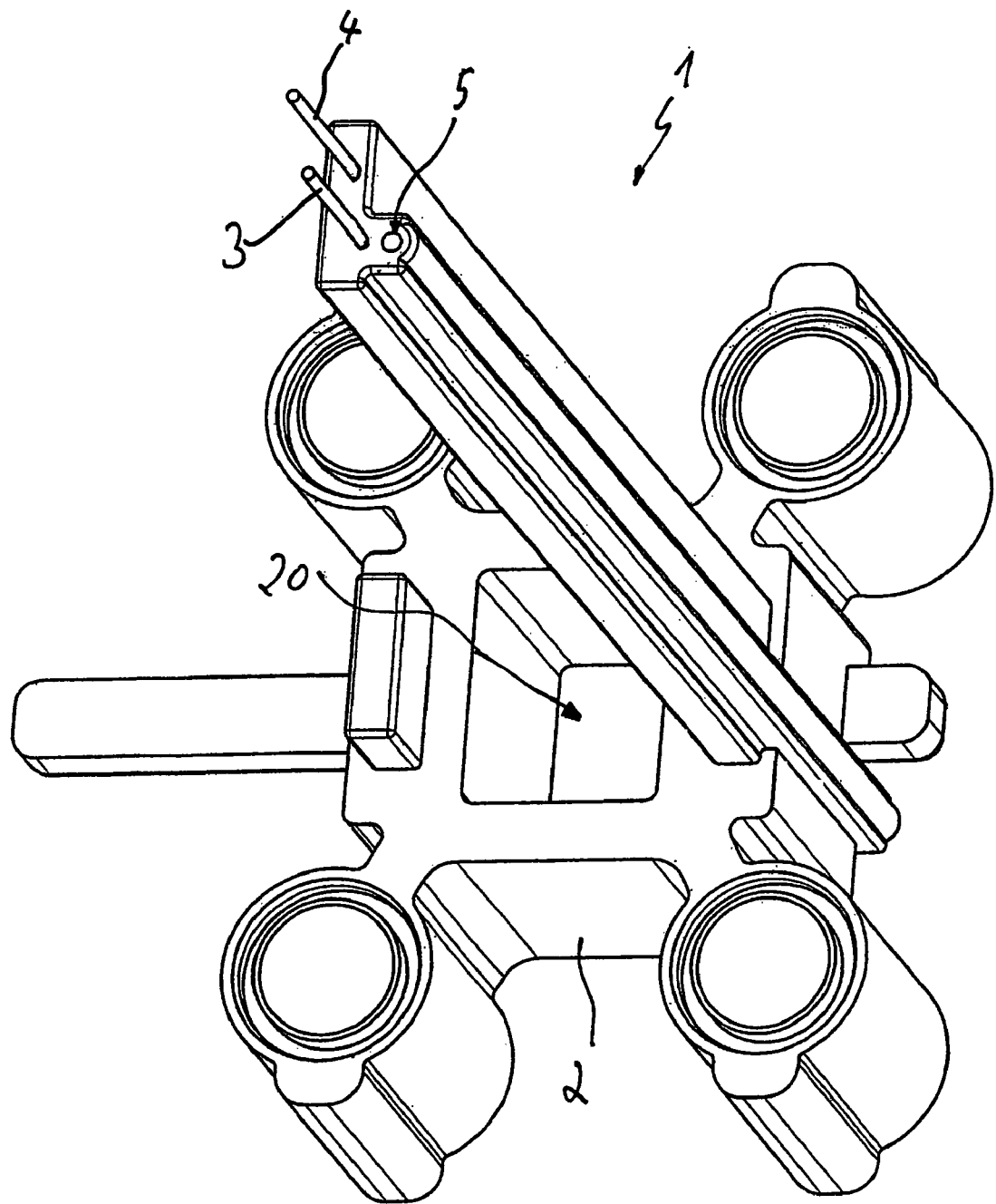
FIG. 1 shows an embodiment of a tank heating system according to the invention

FIG. 1 shows the embodiment of a urea tank heating system 1 in an oblique view. The tank heating system 1 is provided with a plastic housing 2 in which are embedded 2 connection lines 3, 4, by means of which a PTC heating element, described in more details in FIG. 2, inside the tank heating system 1 is supplied with electric power. Accordingly, the connection line 3 is connected to a power source, e.g., 13 V of a car battery, and the connector line 4 is shunted to earth. At threshold temperature, the PTC (positive temperature coefficient) heating elements present a rapid increase of their electric resistance which would preclude an overheating.

In the illustrated embodiment, the connection lines 3, 4 run parallel to an intake pipe 5 that is configured as a channel in the plastic housing 2. According to the invention, the intake pipe 5 is connected to a urea supply line so that urea solution can be pumped through the intake pipe 5 out of a urea tank and be carried to a waste gas catalyst of a motor vehicle.

The connection line 3 consists of a resistance wire made out of a heat conducting alloy such, e.g., a FeCrAl alloy. It is also feasible to use a PTC alloy. The specific resistance of the utilized resistance wire should be preferably at least 0.2 $\Omega mm^2/m$, especially at least
1.0 $\Omega mm^2/m$, especially preferred at least 1.2 $\Omega mm^2/m$, and 1.44 $\Omega mm^2/m$ in the illustrated embodiment. Therefore, in the case of the illustrated tank heating system, the connection line 3 produces sufficient heat during operation in order to thaw out the frozen urea in the intake pipe 5, so that the urea solution, defrosted by the PTC elements, can be conveyed at the earliest possible moment from the urea tank by the intake pipe 5.

In order to take advantage of a rapid defrosting of the frozen urea in the intake pipe 5, it is possible to manufacture both connection lines 3, 4 out of resistance wire and to attach both in the immediate proximity of the intake pipe 5. As a rule, it suffices to use resistance wire for one of the two connection lines 3, 4. To obtain the best possible heat coupling to the intake pipe 5, it is advantageous to arrange the connection line 3 or connection lines 3, 4, out of resistance wire, as close as possible to the intake pipe 5.

Figure 2:
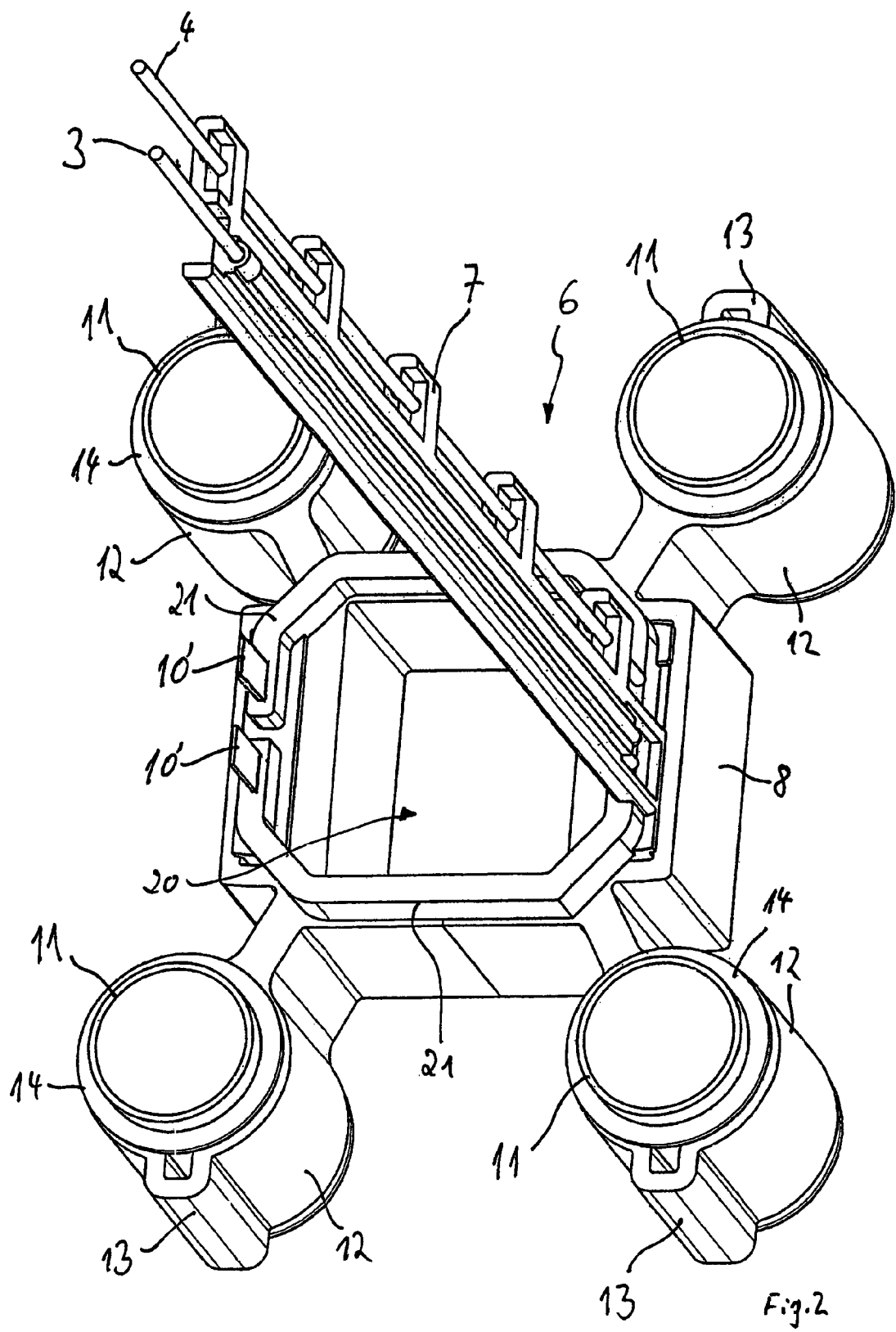
FIG. 2 shows the embodiment represented in FIG. 1 without its housing
Figure 3:
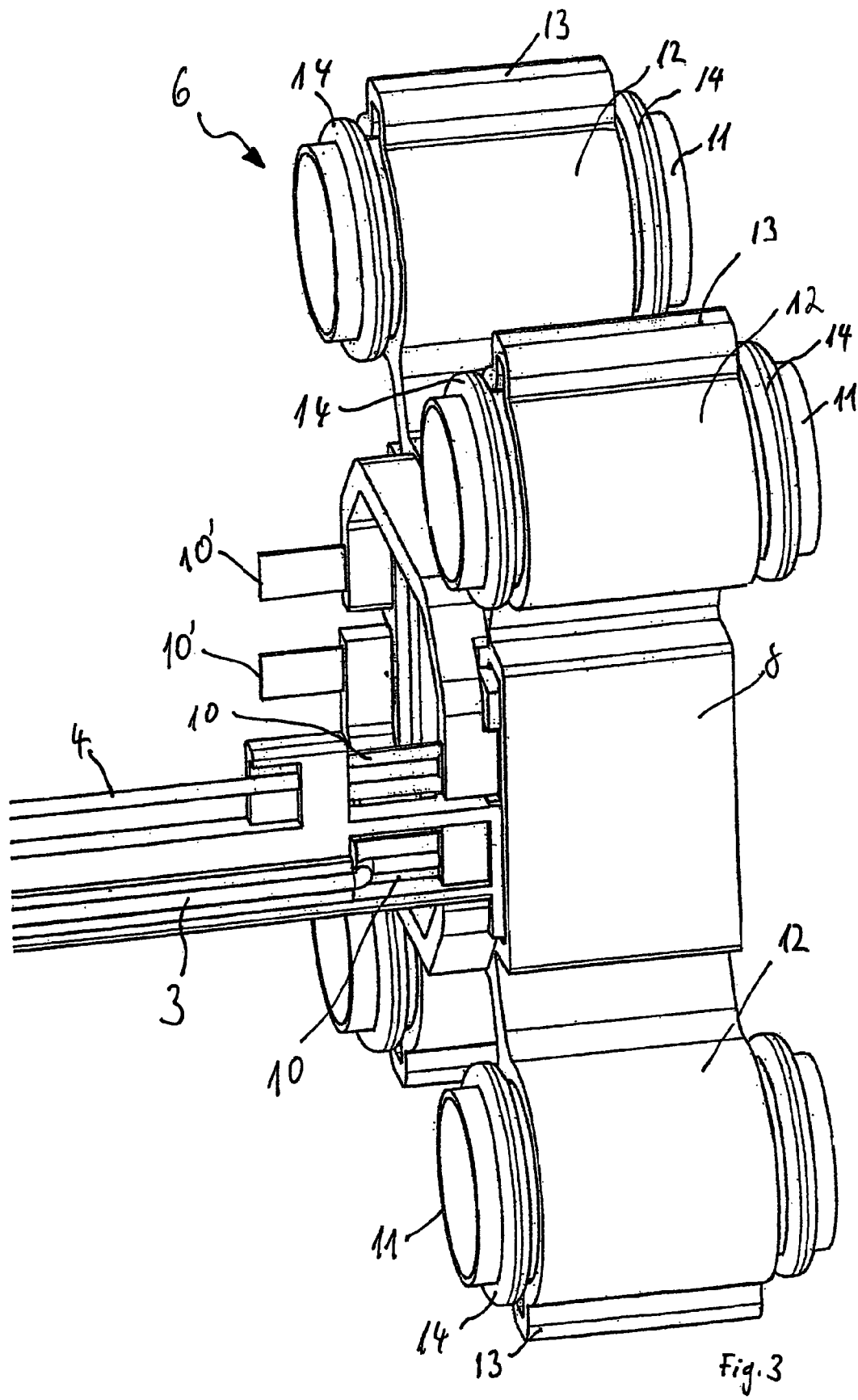
FIG. 3 shows a detail drawing of FIG. 2

FIGS. 2 and 3 show the tank heating system 1, illustrated in FIG. 1, without the plastic housing 2. This illustrated part of the tank heating system is hereinafter designated as internal heater part 6. The connection lines 3, 4 are supported by a plastic support element 7 that is attached to an internal housing 8, in which housing are provided several plate-shaped PTC heating elements. The internal housing 8 is a metal housing, preferably out of an aluminum alloy such as, e.g., an AlMgSi alloy, in particular an $AlMgSi_{0.5...1}$ alloy.

The heating elements are supported on the internal housing 8 by a (not illustrated) assembly frame. The assembly can be considerably simplified by means of an assembly frame because an easily manageable unit is inserted into the internal housing 8. The assembly frame is provided with joint plates 10 that protrude from the internal housing 8 and to which are affixed, preferably welded on, the connection lines 3, 4. The assembly of an appropriate assembly frame with the therein supported components is described in patent DE 102 58 275 A1, the disclosure of which is the object of the application by reference.

So that the heat produced by the PTC heating elements can be conveyed as well as possible to the urea solution in the urea tank, the tank heating system 1 has a central opening 20 for an enlargement of its surface, whereby on each of the two sides of the opening 20 an assembly frame with PTC heating elements is disposed inside the internal housing 8. The joint plates 10 of the first assembly frame are connected to the joint plates 10' of the second assembly frame by means of injection-molded junction lines 21.

After the insertion of the assembly frame with the therein supported PTC heating elements into the internal housing 8, this metal housing 8 is compressed in order to obtain the best possible heat coupling of the heating elements to the internal housing 8. The heat, emitted from the PTC elements, is absorbed by the internal housing 8 and conveyed to the heat exchanger elements 11.

The heat exchanger elements 11 consist of pipe sections out of high-grade steel, preferably V4A steel, that are pressed into brackets 12 of the metal housing 8. The shape of the brackets 12 is adapted to the shape of the heat exchanger elements 11 in order to obtain the largest possible contact surface over which the heat from the brackets 12 can be conveyed to the heat exchanger elements 11. The brackets 12 have an essentially cylindrical shaped interior space for the receiving of the tubular heat exchanger elements 11.

By using high-grade steel pipes as heat exchanger elements 11 it is possible to obtain an improved heat coupling to the urea solution to be heated. This is due to that the caloric conductivity of high-grade steel is higher than that of the plastic housing 2 used as protection of the internal housing 8. Furthermore, by using several heat exchanger elements 11, the produced calorific output can be concentrated on a lower portion of the urea tank so that, even in the case of an only partially full tank, the heat produced by the PTC heating elements can be fully used for the defrosting of the urea solution.

For the pressing process, the brackets 12 have a protrusion 13, open towards the interior space, which is compressed after the insertion of the heat exchange elements 11, so that a compression fold is formed and the inside space is narrowed. The protrusion 13 has preferably a U-shaped cross-section.

As protection against the corrosive urea solution, a synthetic material is sprayed unto the internal heater part 6 of the tank heating system 1, illustrated in FIGS. 2 and 3, thus forming the plastic housing 2. In order to obtain the best possible heat coupling of the heat exchanger elements 11 to the urea solution, the inside surfaces of the pipe sections constituting the heat exchanger elements 11 remain free. The pipe sections are encircled by O-rings 14 at their upper and lower ends, which are inserted into a groove of the plastic housing 2 to prevent the penetrating of urea solution into the plastic housing 2.

Figure 4:
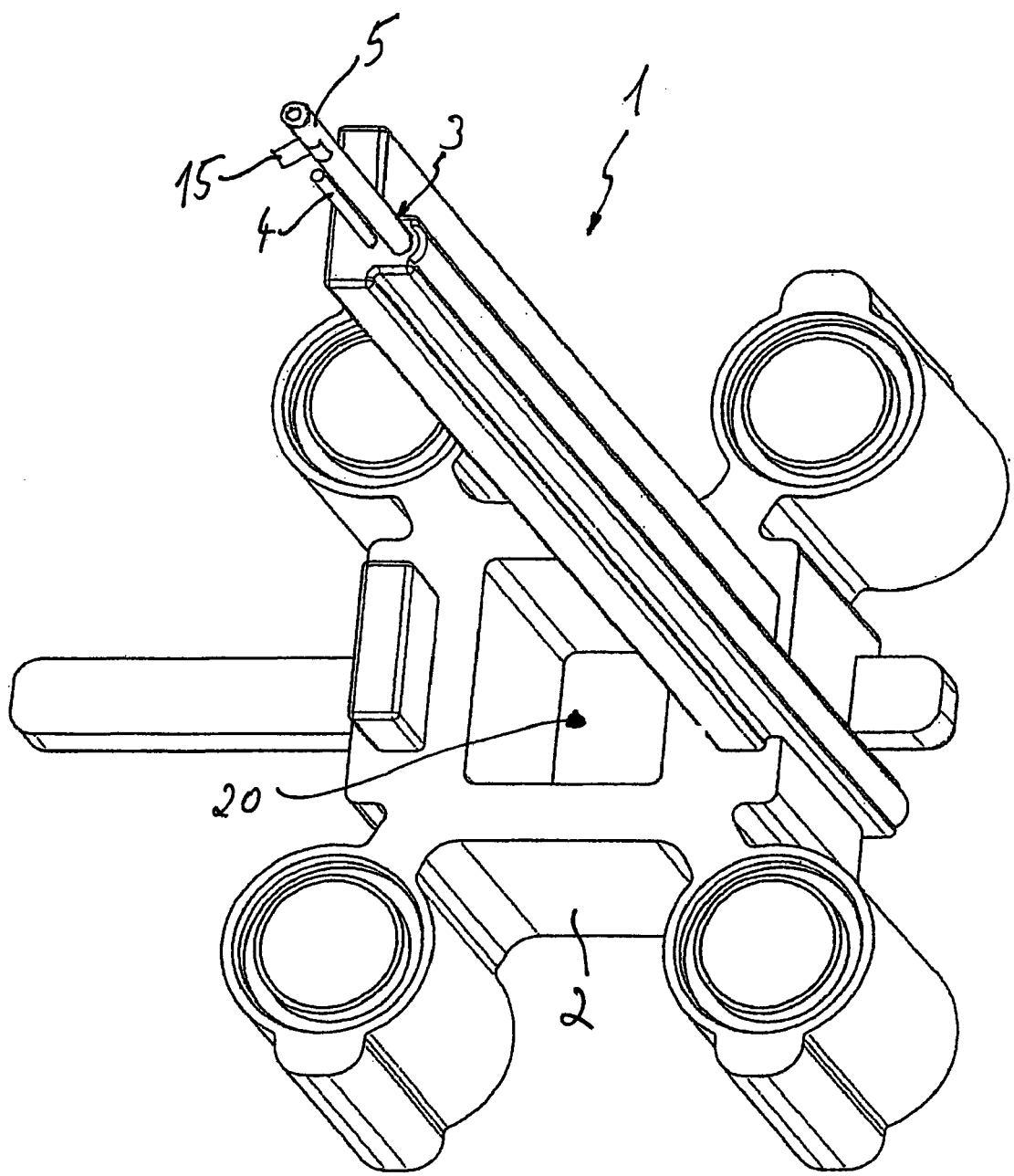
FIG. 4 shows another embodiment of a tank heating system according to the invention and FIG. 5 shows an internal housing of the embodiments represented in FIGS. 1 to 4.

FIG. 4 shows another embodiment of a tank heating system 1. The embodiment shown in FIG. 4 differs from the embodiment described in FIGS. 1 to 3 merely by the fact that the intake pipe 5 is configured as a metal pipe, preferably as a high-grade steel pipe, that is embedded into the plastic housing 2 of the tank heating system 1. The intake pipe 5 is used as a connection line 3 to supply heating current to the PTC elements. The metal pipe 5 has such a high electric resistance that it is sufficiently heated by the heating current in order to defrost the frozen urea in the intake pipe 5. The specific resistance of the metal pipe is preferably at least 0.2 $\Omega mm^2/m$, especially at least 0.6 $\Omega mm^2/m$ and 0.75 $\Omega mm^2/m$ in the illustrated embodiment. The connection pipe 5 is provided with a connection lug 15 for the contacting.

In order to obtain a rapid defrosting of frozen urea in the intake pipe and a rapid operational readiness of a urea supply system for a waste gas cleaning catalyst it is favorable if at least one of the connection lines 3, 4 emits a calorific output of about 10 W to 20 W, and if the PTC heating elements of the tank heating system 1 emits a calorific output of at least 50 W but preferably 70 W to 150 W.

Figure 5:
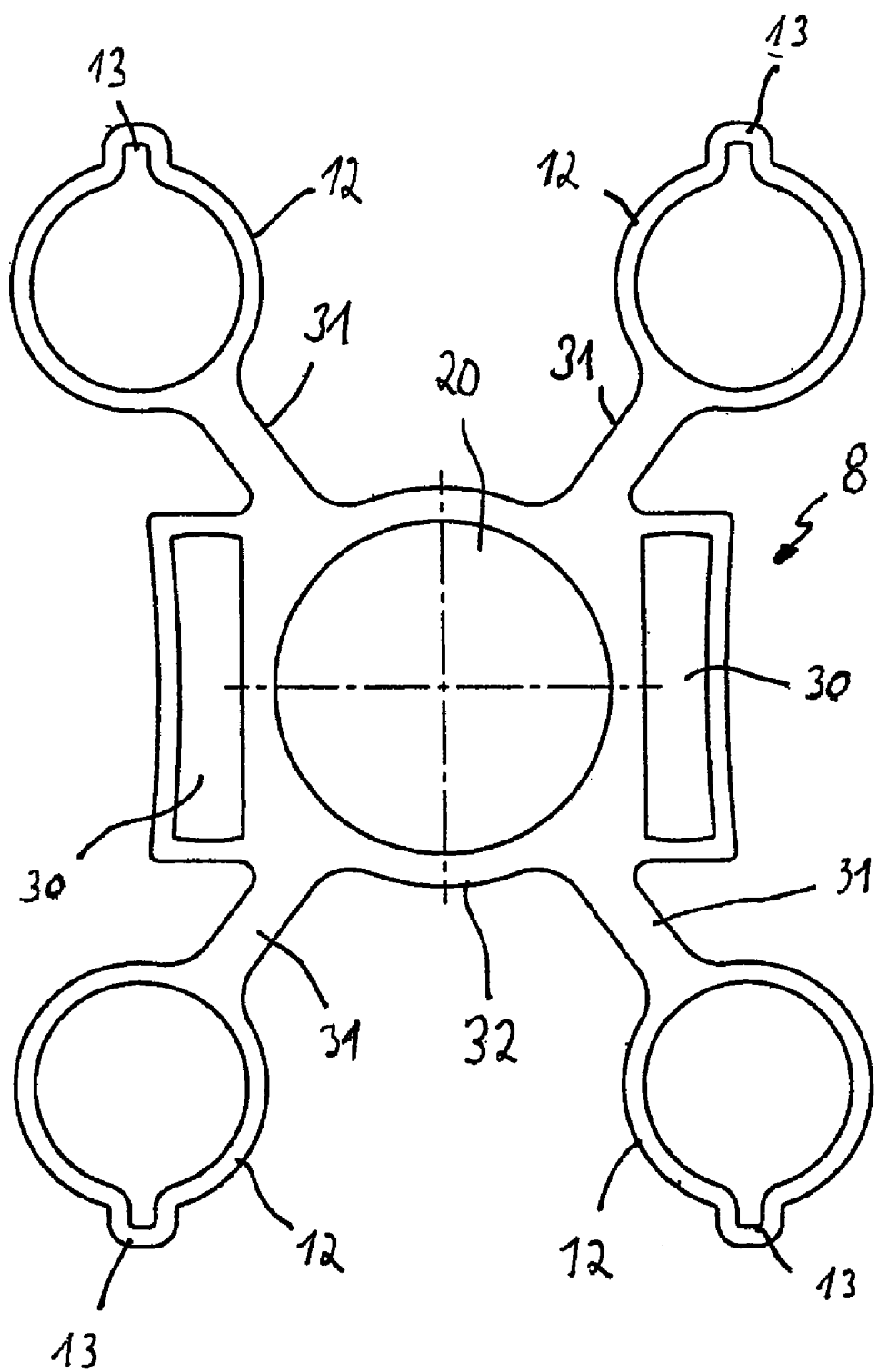

FIG. 5 shows the internal housing 8 of above described embodiments. In the case of the internal housing 8 it deals with a metal housing that is configured as a hollow section, rather as an elastic aluminum alloy extruded section. As it can be seen, the internal housing 8 is provided with two passages 30 in each of which is arranged at least one heating element with a section of an assembly frame.

The internal housing 8 presents further passages in the brackets 12 for the incorporation of the high-grade steel pipes 11. The brackets 12 are connected to a central body 32 by means of arms 31, in which body are placed the PTC heating elements. In such a manner, the produced heat is conveyed over a large surface to the urea solution to be defrosted.

The produced heat can be conveyed in a particularly efficient manner via the tubular brackets 12 because a convectional current is formed therein. This effect can be used also without the utilization of the high-grade steel pipes 11, whereby also the inside surfaces of the brackets 12 will be coated with a synthetic material as anti-corrosive protection.

In FIG. 5 can be seen in particular the protrusions 13 of the brackets 12 which, after the high-grade steel pipes 11 were put into place, are compressed to compression folds.

The central body 32 presents a central channel 20 between the heating channels 30. This central channel 20 causes first and foremost that the central body can be easier compressed in order to create an optimum heat coupling between the PTC heating elements and the metal housing 8. Also in the central channel 20 can be placed a high-grade steel pipe. In order not to encumber the compressing, the central channel 20 remains preferably free, so that its inside surface will also be protected by a sprayed on synthetic material coating, that constitutes the plastic housing 2, against the effects of the urea solution.

REFERENCE NUMBERS LIST

1 Tank heating system
2 Plastic housing
3, 4 Connection lines
5 Intake pipe
6 Internal heater part
7 Supporting body
8 Internal housing
10, 10' Joint plates 11 Heat exchanger elements
12 Brackets
13 Protrusion
14 O-ring
15 Connection lug
20 Central opening
21 Junction lines
30 Passage
31 Arms
32 Central body

The invention claimed is:

1. A tank heating system comprising:
   a housing;
   a PTC heating element arranged in said housing for melting frozen fluid in said tank;
   an electric connection line in communication with the PTC heating element for providing current to the PTC heating element,
   an intake pipe for conveyance of fluids; and
   a resistance heating element in thermal communication with the intake pipe for heating the intake pipe, said resistance heating element being a section of said electric connection line.

2. The tank heating system according to claim 1, wherein the section of the connection line, configured as a resistance heat element, comprises a resistance wire made out of a heat-conducting alloy.

3. The tank heating system according to claim 1, wherein the intake pipe is configured as a channel in the housing.

4. The tank heating system according to claim 1, wherein the section of the connection line, configured as resistance heating element, is formed of metal.

5. The tank heating system according to claim 1, wherein the intake pipe is formed of high-grade steel.

6. The tank hearing system according to claim 1, wherein the PTC element includes an internal heater part surrounded by the housing, the housing being an injection-molded part.

7. The tank heating system according to claim 6, wherein the internal heater part comprises a metal housing, with at least one PTC element.

8. The tank heating system according to claim 7, wherein the metal housing includes at least two passages, each passage having at least one PTC heating element.

9. The tank heating system according to claim 7, wherein the metal housing is affixed to the intake pipe.

10. The tank heating system according to claim 7, wherein the metal housing is an extruded section.

11. The tank heating system according to claim 7, wherein the metal housing is connected to at least one heat exchanger element.

12. The tank heating system according to claim 11, wherein the metal housing is compressed with at least one heat exchanger element.

13. The tank heating system according to claim 11, wherein at least one heat exchanger element is a pipe.

14. The tank heating system according to claim 13, wherein the metal housing has a protrusion extending in a longitudinal direction of the high-grade steel pipe and includes an open cross-section facing the pipe.

15. The tank heating system according to claim 13, wherein the pipe is encircled by an O-ring.

16. The tank heating system according to claim 7, wherein the metal housing comprises several tubular brackets for carrying off of produced heat.

17. The heating element according to claim 16, wherein at least one PTC element is provided in a central body of the housing.

18. The tank heating system according to claim 7, wherein the metal housing is formed of an aluminum alloy.

* * * * *